United States Patent [19]

Taylor et al.

[11] Patent Number: 5,670,244
[45] Date of Patent: Sep. 23, 1997

[54] MULTIPLE LAYER VINYL/ALUMINUM BUILDING COMPOSITE

[75] Inventors: Daniel Taylor, Lincraft; Joseph P. Ippolito, Cranbury; I. M. Rempter, Scotts Plain, all of N.J.

[73] Assignee: Gentek Building Products, Inc., Cleveland, Ohio

[21] Appl. No.: 500,396

[22] Filed: Jul. 10, 1995

[51] Int. Cl.$^6$ ........................................ B32B 7/02
[52] U.S. Cl. .................. 428/213; 428/304.4; 428/318.4; 428/319.3; 428/544
[58] Field of Search ....................... 428/213, 304.4, 428/318.4, 319.3, 544

[56] References Cited

U.S. PATENT DOCUMENTS

| | | | |
|---|---|---|---|
| 4,043,062 | 8/1977 | Lehrman | 38/140 |
| 4,097,633 | 6/1978 | Focht | 428/138 |
| 4,205,110 | 5/1980 | Jean | 428/213 |
| 4,788,808 | 12/1988 | Slocum | 52/521 |

OTHER PUBLICATIONS

Encyclopedia of Polymer Science and Engineering, vol. 1, John Wiley & Sons, New York, pp. 569,564.

*Primary Examiner*—Kathleen Choi
*Attorney, Agent, or Firm*—Calfee, Halter & Griswold LLP

[57] ABSTRACT

A multi-layer vinyl/aluminum composite useful for formulating simulated wood siding comprises an aluminum foil substrate carrying a surface coating of polyvinyl chloride or other polymer and being provided on its backside with a backing layer comprising a flexible polymer foam.

7 Claims, 2 Drawing Sheets

MULTIPLE LAYER VINYL/ALUMINUM BUILDING COMPOSITE

Aluminum siding and vinyl siding are well known synthetic products intended to serve as wood substitutes in the building industry. Each has it own unique advantages and disadvantages.

For example, aluminum products have a lower coefficient of thermal expansion and better weatherability than vinyl products. Also, aluminum products are easy to fabricate, since they can be made from continuous rolls of aluminum which are slit to the desired width and then roll-formed into the desired configuration. Vinyl products are typically produced by extrusion processes, which are much slower and more troublesome.

On the other hand, vinyl products are easier to install. They also are considerably less expensive in terms of raw material cost.

In order to combine the benefits of both aluminum and vinyl products, efforts have been made to develop composites made from both materials. For example, one proposal has been to extrude polyvinyl chloride onto aluminum foil thereby producing a vinyl chloride/aluminum composite. This technology has not found wide acceptance in industry.

Another proposal has been to form vinyl chloride/aluminum composites by liquid coating techniques. In accordance with this technology, a liquid composition comprising the polymer dissolved or dispersed in a liquid carrier is "painted" on or otherwise applied to the aluminum foil substrate and thereafter heated to melt the resin and thereby form a smooth, continuous surface coating. In the case of polyvinyl chloride, the liquid carrier is typically a plastisol, i.e. a dispersion of polyvinyl chloride in a plasticizer for the polyvinyl chloride. Also, the "painting" or coating technique normally used in commercial practice is roll-coating.

Because roll-coating and other liquid coating techniques are considerably faster than extrusion processes, vinyl/aluminum composites made by liquid coating techniques are less expensive than those made by extrusion coating. Also, because composites made by liquid coating are typically supplied in industry in the form of large rolls of continuous sheets, these composites can also be processed in subsequent forming steps by the same inexpensive techniques typically employed on aluminum products. For example, a large continuous roll of the inventive composite can be unwound to the desired width, slit and then roll-formed to shape in the same way a large roll of aluminum foil is processed into final products.

Further developments to the technology of forming vinyl/aluminum composites by liquid coating techniques have been made in industry in recent years. For example, other polymers in addition to polyvinyl chloride have been employed for providing the polymer surface coating. For example, unsaturated polyester resins have also been used, in which case the liquid coating composition is also provided with a cross-linking agent to effect cure of the polymer coating once it is applied. Still other polymers found useful in forming the coating of the composite include fluorocarbon polymers and acrylic polymers. In one commercial embodiment, a polymer mixture containing about 70 wt. % thermoplastic fluorocarbon polymer and about 30 wt. % thermosetting acrylic resin is used for this purpose.

Another development in this technology has been to use other coating techniques, such as ADC bar coating. This is a liquid extrusion process used on coating lines allowing for unique surface appearance. This technique is fast and easy to control.

Still other developments in this technology have been to include various conventional additives in the polymer coating compositions. Titanium dioxide is usually included in these polymer coatings to serve both as an ultraviolet light stabilizer and to effect a light or whitish color to the coating. Other fillers, extenders, stabilizers, lubricants, processing aids, softeners and other conventional additives are also oftentimes included. In polyvinyl chloride-based coatings, plasticizers are normally included in the coating composition so that the ultimate product contains a significant amount, e.g. about 10% by weight, plasticizer in the finished product coating.

Although vinyl/aluminum composites represent an improvement over synthetic building products made from aluminum or vinyl alone, they still do not offer the "look" and "feel" of the wood products they are intended to replace.

Accordingly, it is an object of the present invention to produce a new synthetic composite which can be formed into building products having a look and feel more closely approximating that of the wood products they are intended to replace.

In addition, it is a further object of the present invention to produce a new composite which exhibits the processing and performance characteristics of metal siding products with the cost advantages and look of vinyl siding products.

SUMMARY OF THE INVENTION

These and other objects are accomplished by the present invention in accordance with which a new synthetic building composite comprises a metal foil substrate, a polymer surface coating on one side thereof and a backing layer on the back side of the metal foil substrate, the backing layer comprising a polymer foam material, preferably a flexible polymer foam.

In accordance with the present invention, it has been found that a composite of this structure provides a superior look and feel as compared with conventional vinyl/aluminum composites available today and moreover exhibits the processing and performance characteristics of metal siding products with the cost advantages and appearance of vinyl siding products.

BRIEF SUMMARY OF THE DRAWINGS

The present invention may be better understood by reference to the following drawings, wherein.

DETAILED DESCRIPTION

Figure 1:
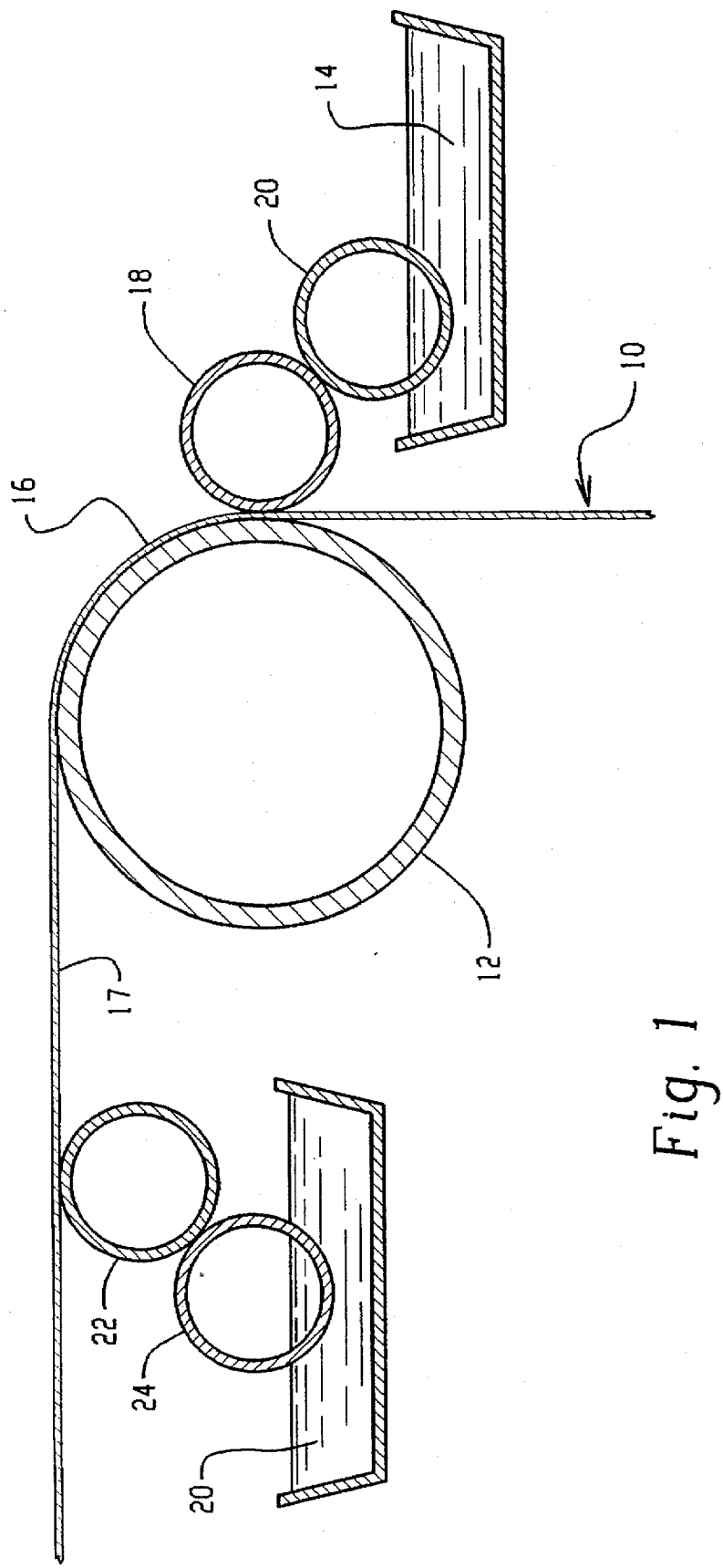
FIG. 1 is a schematic illustration of the roller coating steps carried out in the typical process for forming the composite of the present invention.

The inventive composite is formed from a metal foil layer, a polymer surface coating and a backing layer comprising a flexible polymer foam material, preferably a flexible polymer foam.

The foil layer of the inventive composite can be formed from any metal which can be worked into the desired shape after composite formation by conventional cold-forming operations such as roll forming, drawing, punching and the like. By "cold-forming" is meant a mechanical shaping process which is carried out at a temperature below which significant softening of any of the layers of the composite occurs. Aluminum, particularly various aluminum alloys, are preferred.

Commercially-available aluminum siding, as well as commercially-available vinyl/aluminum composite siding, are typically formed from a standard, inexpensive, aluminum alloy such as alloy AA3105. This alloy can be used to form the composite of the present invention, if desired. Preferably, however, an aluminum alloy having a higher tensile strength and an improved flexibility is used. Such alloys are well-known in the art and typically referred to as "canning stock alloys," since they are normally used in the manufacture of aluminum cans for food products and the like. An example of such an alloy is AA3004.

The gauge or thickness of the metal foil substrate of the inventive composite can vary widely. Essentially any thickness as desired can be employed. As a practical matter, however, thicknesses on the order of about 0.01 to about 0.024 inch are preferred, about 0.011 inch being particularly preferred.

In this connection, the vinyl/aluminum composite siding products available today typically have aluminum layers with thicknesses no less than about 0.014 inches. This is because the strength and rigidity of the aluminum normally used is insufficient once the thickness of the aluminum layer drops below about 0.014 inch. In accordance with the present invention, this constraint is obviated by switching to a different alloy, which allows a thinner aluminum foil layer to be used, at less cost, while at the same time still preserving the processing, thermal expansion and weatherability advantages of conventional aluminum siding.

The polymer surface coating used in the inventive composite is made from the same materials as the polymer surface coatings typically found in conventional vinyl/aluminum composites available today. For example, the polymer can comprise various thermoplastic resins such as polyvinyl chloride, fluorocarbons, acrylics and the like or thermosetting resins such as unsaturated polyesters and acrylics. Mixtures of such polymers, such as the commercially-useful mixture containing about 70 wt. % thermoplastic fluorocarbon polymer and about 30 wt. % thermosetting acrylic resin, can also be used.

In addition, the polymer surface coating of the inventive composite can include all of the conventional additives normally included in the polymer surface coatings found in conventional vinyl/aluminum composites available today. For example, plasticizers, fillers, extenders, UV stabilizers, other stabilizers, softeners, lubricants, other processing aids and the like can be included.

The polymer surface coating of the inventive composite can also be applied to the metal foil substrate in the same way as carried out in prior art processes for making conventional vinyl/aluminum composites available today. Thus, although extrusion coating techniques can be used, they are not preferred as they are too slow and expensive. Rather, conventional liquid coating techniques are preferred. As mentioned above, these techniques involve "painting" or otherwise applying a liquid composition comprising the polymer dissolved or dispersed in a suitable liquid carrier onto the surface to be coated followed by heating the applied coating to drive off the carrier and cause the polymer to melt and/or cure into a smooth, continuous coating. Examples of such coating techniques are roll-coating, ADC extrusion coating and spray coating.

Specific examples of suitable coating techniques are as follows: If the polymer surface coating is to be formed from polyvinyl chloride, a preferred coating technique comprises roll-coating a composition comprising approximately 60 to 65% thermoplastic polyvinyl chloride resin, 0 to 2% stabilizers, lubricants and other additives, about 18% titanium dioxide, about 8 to 15% plasticizer such as diethylhexyladipate or dioctylphthalate, and about 7% solvent comprising a mixture of various aliphatic and aromatic hydrocarbons. Once applied, this composition can then be heated to elevated temperature on the order of 360° to 370° F. to drive off the solvent and melt the thermoplastic polyvinyl chloride, thereby forming a smooth continuous polymer surface coating.

If an unsaturated polyester resin is to be used to form the polymer surface coating, a preferred coating technique is to roll-coat the metal foil substrate with a composition comprising approximately 40% thermosetting or thermoplastic polyester or acrylic resin including cross-linking agent, about 10 to 15% titanium dioxide, and the balance being an organic solvent such as xylene, toluene, isobutyl alcohol or the like. Some polymers can also be dispersed or dissolved in water. The applied coating is then heated to an elevated temperature such as 470° F. to drive off the solvent and cross-link the resin, thereby forming a smooth, continuous coating.

If a fluorocarbon is desired as the polymer surface coating, then a preferred application method is to roll-coat the metal foil substrate with a coating composition containing approximately 50% solvents, 10% titanium dioxide and about 40% of a polymer blend, the blend containing about 70% thermoplastic fluorocarbon polymer and about 30% thermosetting or thermoplastic acrylic resin based on the total polymer content. As in the case of the other application techniques, the coating after application is heated to evaporate the solvent and cause the resin to form a cured, continuous surface coating.

The amount of polymer surface coating to be applied to the metal foil substrate in the inventive composites can vary widely. In prior art composites, polyvinyl chloride surface coatings are typically provided in thicknesses of approximately 0.004 inch. Polyester, fluorocarbon and acrylic surface coatings, however, are typically provided in thicknesses on the order of about 0.001 inch. In accordance with the present invention, the same thicknesses for the polymer surface coatings can be used, if desired. Basically, any polymer thickness can be used, although thicknesses on the order of 0.001 to 0.012 inch are preferred, with thickness of about 0.005 to about 0.008 inch being particularly preferred.

In accordance with the present invention, the backside of the metal foil substrate, i.e. the major surface of the metal foil substrate not carrying the polymer surface coating, is provided with a backing layer comprising a polymer foam material, preferably a flexible polymer foam. This polymer foam can be formed from any polymer which will form a polymer foam material and also which will not excessively degrade over time in the environment in which the composite is to be used. Typically, the polymer foam will be formed from the same polymer, or at least one of the same polymers, used to form the polymer surface coating. In other words, the same polymers used to form the polymer surface coating of the inventive composite can also be used to form the polymer foamed backing layer of the inventive composite. Also, in particular embodiments of the invention, the backing layer can be formed from the same or a different polymer than used to form the surface coating layer.

The polymer foam backing layer of the inventive composite is applied to the back side of the metal foil substrate in essentially the same way as the polymer surface coating. Specifically, the foamed backing layer is most easily applied by a liquid coating technique in which a liquid coating-composition comprising a solution or dispersion of the polymer in a suitable liquid carrier, optionally including a plasticizer for the polymer, is coated on to the back side of the aluminum foil substrate and then heated to cause evaporation of the solvent, melting or curing of the polymer and at the same time generation of gas so as to cause the coating as a whole to expand into the form of a foam.

In this connection, the coating composition used to form the polymer foam backing layer of the inventive composite is typically provided with a blowing or expanding agent which will decompose or react and thereby form a gas when subjected to the elevated temperatures encountered in the subsequent heating step. Essentially any conventional blowing or expanding agent can be used for this purpose. Blowing agent having decomposition temperatures from 300° to 500° F. are preferred. Examples of suitable blowing agents are azodicabonamide, 5-phenyltetrazole, sulfonyl hydrozides, and sulfonyl semicarbazide. The level or amount of blowing agent can vary widely and essentially any amount can be used, although amounts on the order of about 0.5 to about 1 wt. % are typical.

In this regard, techniques for forming foamed polymer coatings are well known in the art, and any such technique can be used for forming the backing layer of the inventive composite. In particular, the various application techniques, identities and amounts of blowing agent and other ingredients to be employed in forming polymer foam coatings are well understood and can be readily adjusted by those skilled in the art to give the desired characteristics to the final composite product of the present invention.

In a preferred embodiment, the foam backing layer of the inventive composite is flexible since the composite will be worked by cold forming into articles of non-planar shapes. In this embodiment, it is preferred that these foams exhibit a flexibility sufficient to allow subsequent working operations such as roll-forming without destroying the applied coatings.

In general the polymers described above will all form flexible polymer foams when the liquid coating compositions they are supplied from also contain a blowing or expanding agent. Other polymers, however, can be used to form the foamed backing layer when a rigid foam is desired. For example, polyurethane can be used for this purpose.

The various additional ingredients typically included in the polymer surface coating of the inventive composite can also be included in the backing layer employed in the inventive composite. However, since the backing layer will not be exposed to sunlight in normal use, the ultraviolet light stabilizer is normally omitted. Also, since the backing layer will not normally be exposed to view, the titanium dioxide filler typically used in the polymer surface coating can be eliminated or at least replaced with a considerably less expensive filler such as calcium carbonate or the like.

The amount of foamable polymer coating composition applied to the back side of the aluminum foil substrate can vary widely and depends, primarily, on the desired thickness of the foamed backing layer in the final composite product. Typically, the backing layer will have a thickness on the order of about 0.003 to about 0.014 inch, preferably 0.006 to 0.012 inch, more preferably 0.008 to 0.009 inch. The completed composites of the invention will therefore have thicknesses on the order of 0.020 to 0.060, preferably 0.024 to 0.044, inch. Other thicknesses can be employed, as desired.

In forming the inventive composite, the polymer surface coating and the backing layer can be applied directly to the metal foil substrate as received from the manufacturer. Preferably, however, the metal foil substrate is subjected to a cleaning/pretreatment procedure to enhance the ability of both polymer coatings to adhere thereto.

Cleaning/pretreatment procedures for improving the adhesion of polymer coatings to metal substrates are well known, and any such conventional procedure can be used in accordance with the present invention. An example of such procedure is as follows:

First, the metal foil substrate is thoroughly cleaned on both sides thereof by subjecting the metal substrate to a mild aqueous acid wash at a pH of about 3 to 4. This will clean surface dirt, metal fines and rolling lubricant from the foil surfaces.

Next, both sides of the substrate are treated with a conventional metal pretreatment composition known to improve the adhesion of polymer coatings thereto. An example of such a pretreatment composition is the titanium-based acid aqueous liquid pretreatment chemical sold by BETZ Chemical Company under the designation "Permatreat 1011." Any other conventional metal pretreatment material can be used.

Finally, the substrate, after drying, is primed by applying to both sides a conventional water-based primer such as the water-based primer sold by Sherwin Williams Company under the designation REX ETTWC 500. Other conventional metal, cleaning, pretreatments and primers can also be employed.

Figure 2:
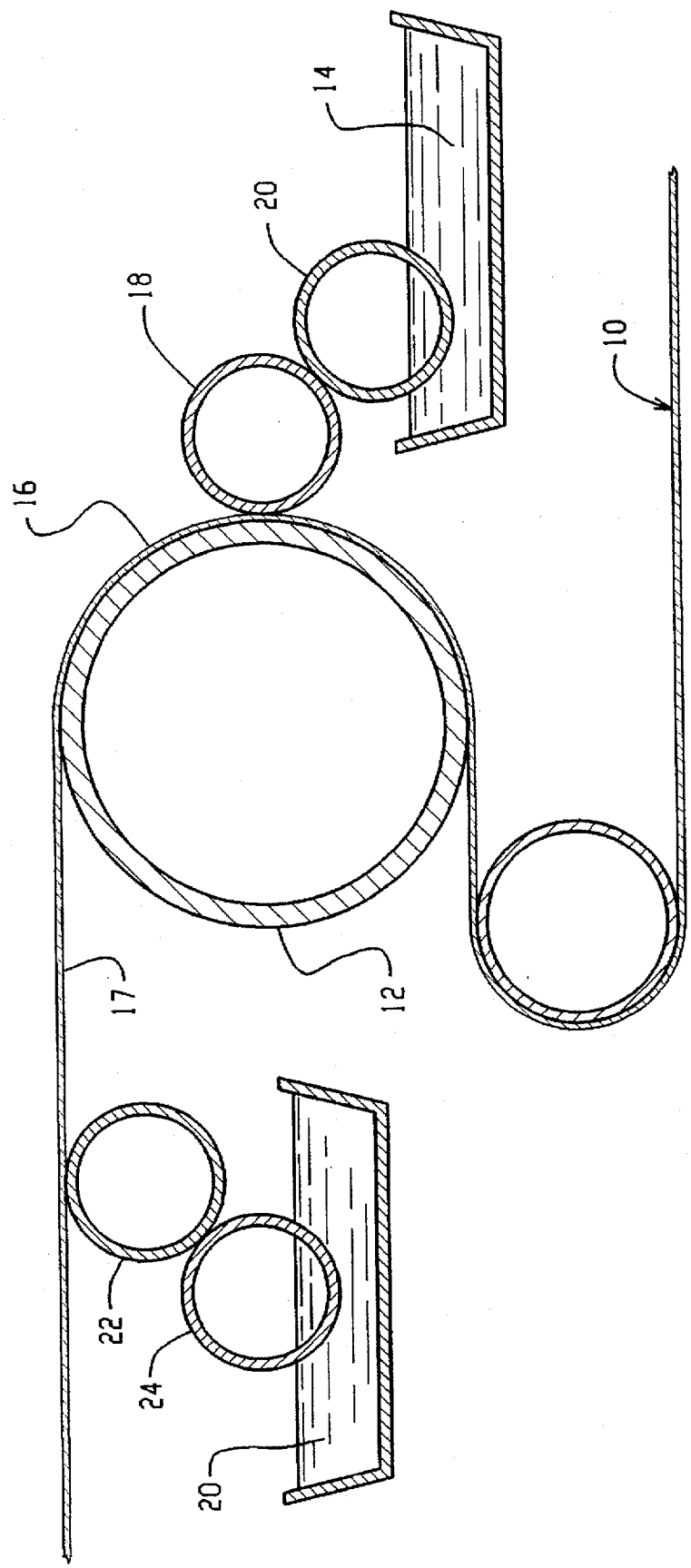
FIG. 2 is a schematic illustration similar to FIG. 1 showing another arrangement for carrying out the coating steps used to produce the novel composite of the present invention.

After optional cleaning and pretreatment, the metal foil substrate is then provided with polymer coatings on both its front and backside surfaces as described above. FIGS. 1 and 2 herein illustrate two different ways this can be done. In both techniques, a metal strip 10 is wound over at least a portion of the circumference of a large cylindrical backup drum 12. A polymer surface coating composition generally indicated at 14 is applied to the first or upper surface 16 of the metal strip 10 by means of a top applicator roll 18 and a top pick up roll 20. After metal strip 10 leaves the surface of backup drum 12, its backside or lower surface 17 is coated with a layer of a backside coating composition 20 by means of a backside roll 22 and backside pick up applicator roll 24. Thereafter, the double coated metal foil strip is passed into an oven where it is heated to a temperature and for a time sufficient to cause evaporation of the solvent and cure and/or melting of the polymers in both surface and backside coating compositions. At the same time, the blowing agent included in the backside coating composition decomposes or reacts to generate a gas which causes the backside coating layer to foam during curing, thereby producing a solidified, flexible, polymer foam at the end of the heating step. Residence times on the order of 20 to 40 seconds and temperatures of the metal and coatings on the order of 350° to 500° F. are normal for this operation.

After the heating step, the composite so formed can be cooled if desired, for example, by spraying with water or the like to thereby form the completed composite of the present invention.

The completed composite can then be processed into a final building product in a conventional fashion. Typically, this is done by slitting the composite to the desired width and embossing the surface coating to provide the desired texture thereto. If a product with a non-planar shape is desired, the composite can then be subjected to roll forming or other conventional cold-forming operation such as die-punching, cutting to the desired length and the like.

In industrial practice, the composite of the present invention may also be sold as an item of commerce as is, i.e. prior to any slitting, embossing, forming and the like. In such case, the inventive composite, after being cooled sufficiently to prevent deformation of either of its coatings, is typically wound up on a roll for storage and shipment. The ultimate purchaser can then unwind the role and subject the composite to forming and shaping operations as desired.

Working Example

A multi-layer vinyl/aluminum composite was produced in the general manner described above. In producing this composite, both sides of a AA3994 aluminum alloy foil 0.011 inch thick were first cleaned in a mildly acidic aqueous wash, pretreated by the application of a titanium-based acidic aqueous liquid pretreatment composition ("Permatreat 1011" available from BETZ Chemical Company), dried, primed with Sherwin Williams Company REX E71WC500 water-based primer and then dried. Next the primed aluminum foil substrate was coated on its front surface with a polymer surface coating composition comprising 53% PVC, 5% aliphatic hydrocarbon solvent, 5% aromatic hydrocarbon solvent, 5% barium-zinc stabilizer, 7% diethylhexyl adipate, 5% cristobalite, 15% titanium dioxide, and 5% antimony oxide, while the rear or back side of the aluminum foil substrate was coated with a backing polymer coating composition layer comprising 60.5% PVC, 16% aromatic hydrocarbon, 5% barium-zinc stabilizer, 7% diethylhexyl adipate, 1% titanium dioxide, 0.4% azodicarbonamide, 10% magnesium silicate, and 0.1% silicon dioxide, all percents being weight percents.

Coating was accomplished by the roll-coating setup illustrated in FIG. 2 in which the aluminum foil substrate moved at a speed of 300 feet per minute over a cylindrical backup drum having a diameter of 30 inches. Roll-coating was also used to apply the previously-mentioned water-based primer. The pickup rollers and the applicator rollers at all coating stations had diameters of 7.728 inches and rotated at the following speeds.

|  | Primer | Backing Layer | Polymer Surface Coating |
|---|---|---|---|
| Paint Pickup Roll Speed[1] | 140 | 175 | 185 |
| Paint Applicator Roll Speed[1] | 430 | 410 | 365 |

[1]Feet Per Minute

After picking up the backside coating, the double-coated aluminum foil substrate was continuously passed into an oven having four temperature zones set as follows:

Zone 1—400° F.
Zone 2—525° F.
Zone 3—575° F.
Zone 4—600° F.

The residence time of the composite in the oven was 20 seconds resulting in a final polymer coating temperature appropriate for fusion, about 385° F. The product continuously withdrawn from the oven was sprayed with water on both sides for cooling and then wound up into the form of a large roll. The composite so produced measured a total of 0.024 inch thick including a front face coating 0.004 inch thick and a polymer foam back face coating 0.009 inch thick.

Synthetic building products, such as simulated wood siding, made from the inventive composite are relatively inexpensive to produce. This is because they are made with thinner gauge aluminum than used in prior art vinyl/aluminum products and also because they are made with conventional roll-coating, slitting and roll-forming techniques. At the same time, synthetic building products made from the inventive composite exhibit the same good weatherability and thermal expansion properties of aluminum based products since they still contain an aluminum layer of significant thickness. Moreover, synthetic building products made from the inventive composite also exhibit the same good appearance features as vinyl based products, since their surface coats are still based on polymeric materials. Furthermore, synthetic building products made from the inventive composites exhibit better sound-proofing qualities compared with currently available vinyl/aluminum composites because of the additional backing layer thereon. Finally, synthetic building products made with the inventive composite exhibit a "look" and "feel" more closely resembling that of the natural wood products they are intended to replace, since the additional backing layer adds bulk, soundproofing and appearance features not found in conventional vinyl/aluminum composites available today.

Although only a few embodiments of the present invention have been described above, it should be appreciated that many modifications can be made without the departing from the spirit and scope of the invention. All such modifications are intended to be included within the scope of the present invention, which is to be limited only by the following claims.

We claim:

1. A composite capable of being formed into a shaped article by cold forming, said composite being about 0.02 to 0.06 inch thick and comprising a layer of aluminum alloy about 0.01 to 0.024 inch thick having a front surface and a backside, a polymer surface coating about 0.001 to 0.004 inch thick on said front surface, said polymer surface coating being capable of being embossed to thereby form a textured surface simulating wood, and a backing layer comprising a flexible polymer foam about 0.003 to 0.012 inch thick on said backside.

2. The composite of claim 1, wherein said polymer surface coating and said backing layer are each formed by roll coating said layer of aluminum alloy.

3. The composite of claim 2, wherein each of said polymer surface coating and said backing layer is independently selected from the group consisting of polyvinyl chloride, fluorocarbons, thermoplastic acrylics, unsaturated polyesters and thermosetting acrylics.

4. The composite of claim 2, wherein said polymer surface coating has a textured surface whereby said composite simulates wood.

5. The composite of claim 1, wherein said polymer surface coating has a textured surface whereby said composite simulates wood.

6. A building product comprising a shaped article produced by cold forming the composite of claim 1.

7. The building product of claim 6, wherein said polymer surface coating has a textured surface whereby said building product simulates wood.

* * * * *